US011556127B2

(12) United States Patent
Zhu

(10) Patent No.: US 11,556,127 B2
(45) Date of Patent: Jan. 17, 2023

(54) STATIC OBSTACLE MAP BASED PERCEPTION SYSTEM

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 249 days.

(21) Appl. No.: 16/840,278

(22) Filed: Apr. 3, 2020

(65) Prior Publication Data
US 2021/0311474 A1 Oct. 7, 2021

(51) Int. Cl.
| G05D 1/00 | (2006.01) |
| G05D 1/02 | (2020.01) |
| G01S 17/89 | (2020.01) |
| B60W 60/00 | (2020.01) |
| G06T 7/246 | (2017.01) |
| G06T 7/73 | (2017.01) |
| G06T 7/11 | (2017.01) |
| G01S 17/931 | (2020.01) |

(52) U.S. Cl.
CPC ......... *G05D 1/0088* (2013.01); *B60W 60/001* (2020.02); *G01S 17/89* (2013.01); *G01S 17/931* (2020.01); *G05D 1/0214* (2013.01); *G06T 7/11* (2017.01); *G06T 7/246* (2017.01); *G06T 7/73* (2017.01); *B60W 2554/20* (2020.02); *B60W 2554/40* (2020.02); *B60W 2556/45* (2020.02); *G05D 2201/0213* (2013.01); *G06T 2207/10028* (2013.01); *G06T 2207/30261* (2013.01)

(58) Field of Classification Search
CPC .............. G05D 1/0088; G05D 1/0214; G05D 2201/0213; G06T 7/11; G06T 7/246; G06T 7/73; G06T 2207/10028; G06T 2207/30261; G01S 17/931; G01S 17/89; G60W 60/001; B60W 60/001; B60W 2554/20; B60W 2556/45; B60W 2554/40
See application file for complete search history.

(56) References Cited

U.S. PATENT DOCUMENTS

| 9,507,346 B1 * | 11/2016 | Levinson ............ G06F 3/04847 |
| 9,606,539 B1 * | 3/2017 | Kentley ............... G05D 1/0027 |
| 9,672,446 B1 * | 6/2017 | Vallespi-Gonzalez ...................... G06K 9/6267 |

(Continued)

OTHER PUBLICATIONS

Kiran et al, "Real-time Dynamic Object Detection for Autonomous Driving using Prior 3D-Maps", 2018, Computer Vision Foundation (Year: 2018).*

*Primary Examiner* — Peter D Nolan
*Assistant Examiner* — Kenneth M Dunne
(74) *Attorney, Agent, or Firm* — Womble Bond Dickinson (US) LLP

(57) ABSTRACT

The offline map generation process may collect multiple point cloud data of the same area. A perception algorithm may operate on the point cloud data to detect static objects, which may be fixed road features that do not change among the point cloud data, allowing the perception algorithm to more accurately detect the static objects. During online operation of the ADV through the area, the ADV may trim regions-of-interest (ROI) of the area to exclude the pre-defined static objects. The perception algorithm may execute the sensor data of the ROI in real-time to detect objects in the ROI. The may be added back to the output of the perception algorithm to complete the perception output.

20 Claims, 9 Drawing Sheets

(56) References Cited

U.S. PATENT DOCUMENTS

| | | |
|---|---|---|
| 2018/0005052 A1* | 1/2018 | Browning ............ G05D 1/0276 |
| 2018/0188039 A1* | 7/2018 | Chen .................... G01C 21/005 |
| 2018/0203446 A1* | 7/2018 | Wyffels .................. G01S 17/42 |
| 2019/0122378 A1* | 4/2019 | Aswin ..................... G06T 5/003 |
| 2019/0258737 A1* | 8/2019 | Wang ..................... G06V 20/56 |
| 2019/0323855 A1* | 10/2019 | Mahler ................ G05D 1/0088 |
| 2019/0392232 A1* | 12/2019 | Ma ........................ G01S 17/931 |
| 2020/0109954 A1* | 4/2020 | Li ......................... G05D 1/0278 |
| 2020/0184231 A1* | 6/2020 | Viswanathan ... G06V 30/19173 |
| 2020/0233420 A1* | 7/2020 | Liu ........................ G05D 1/024 |
| 2021/0237769 A1* | 8/2021 | Ostafew .......... B60W 30/18163 |

\* cited by examiner

400

| Application 401 | Planning and Control 402 | Perception 403 | Device Driver(s) 404 | Firmware 405 | Hardware 406 |

FIG. 4

STATIC OBSTACLE MAP BASED PERCEPTION SYSTEM

TECHNICAL FIELD

Embodiments of the present disclosure relate generally to operating autonomous vehicles. More particularly, embodiments of the disclosure relate to methods and systems for aiding the perception algorithm performed by an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicles can navigate to various locations using onboard sensors, allowing the vehicles to travel with minimal human interaction or in some cases without any passengers.

Motion planning and control are critical operations in autonomous driving. The safety, accuracy and efficiency of motion planning and control operations depend on the ability of the ADVs to sense and predict the motions of moving obstacles such as other vehicles or pedestrians as well as to recognize non-moving objects. Sensors such as cameras, light detection and range (LIDAR) units, radars, etc., are used to capture video and electromagnetic images of environments around the vehicles. The ADVs may process information captured by the sensors to perceive driving environment including obstacles, traffic elements and road features surrounding the ADVs for planning and controlling the motions of the ADVs.

To recognize objects surrounding an ADV and to predict the motions or trajectories of nearby vehicles, a perception module of the ADV may use a neural network that operates on the captured sensor data. The motion planning and control operation may process the objects detected by the perception module in view of a pre-generated high-definition (HD) map of the surrounding environment to safely navigate the ADV. The HD map may include road information such as road boundaries, lane configuration, terrains, etc. In some circumstances, captured sensor data may not have sufficient details to enable the perception module to detect all surrounding objects.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an architecture of an autonomous driving system according to one embodiment.

DETAILED DESCRIPTION

Figure 1:
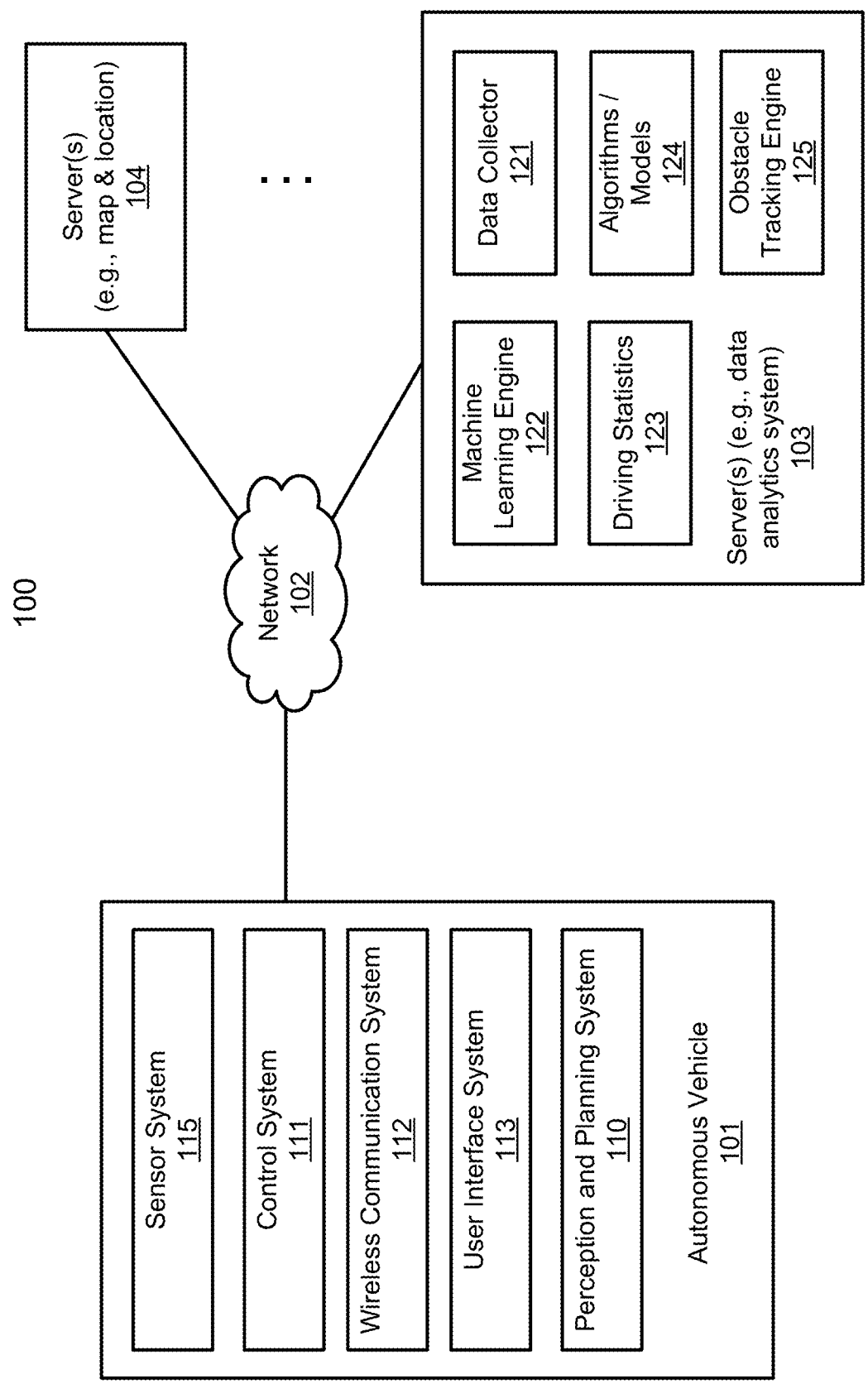
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Motion planning and control of an ADV depends on the ability of the ADV to perceive the driving environment around the ADV such as detecting the trajectories of moving vehicles or pedestrians in proximity to the ADV, as well as the locations of traffic elements, road features, and other non-moving objects. To recognize objects surrounding an ADV and to predict the motions or trajectories of nearby vehicles for safe navigation of the ADV, a perception module of the ADV may use a neural network that operates on the data captured by the perception sensors, such as LIDARs. The objects detected by the perception module may include moving objects such as moving vehicles, pedestrians, bicyclists, etc., and static objects. Some of the static objects may be fixed road features such as guardrails, beams, traffic signs, trees, buildings, etc., and some of the static objects may be objects that are stationary but may be moved such as parked vehicles, traffic cones, temporary road signs, etc.

The motion planning and control operations of the ADV may process information on the objects detected by the perception module and traffic elements provided by a HD map containing information of the operating environment such as road boundaries, lane configuration, terrains, etc., to navigate the ADV through the environment. The HD map may be constructed in an offline process in which perception sensors (e.g., LIDAR sensors) of a mapping vehicle capture data points of an area to be mapped. The data points are referred to as a point cloud and correspond to a pose (e.g., position and orientation) of the sensors at a particular point in time when the data points are captured. Point clouds captured by the sensors from many poses are used to construct the HD map of the area.

To generate the HD map, the mapping vehicle may capture several point cloud data of the same area. For example, the mapping vehicle may drive through several laps of a route to capture multiple point cloud data for the route. The map generation process may combine the multiple point cloud data and may run a perception algorithm on the point cloud data to construct an accurate HD 3D map of the route. Because the point cloud for the same area may be captured multiple times, the combined point cloud data has more details for objects that do not change between the point cloud captures, thus yielding improved detection of these static objects. Disclosed are methods and systems for using information on static objects detected during the map generation process to aid the perception algorithm to navigate the ADV in real-time through the area covered by the map. The perception module of the ADV may use information from the map generation process to improve the detection of static objects in the environment of the ADV, yielding better perception results for planning and controlling the motion of the ADV.

According to some embodiments, a method for aiding a perception algorithm of an ADV is disclosed. The method includes collecting multiple point cloud data for an area from sensors. The method also includes running the perception algorithm on the multiple point cloud data to detect objects for the area. The method further includes removing moving obstacles and stationary obstacles that are movable from the detected objects to generate static obstacles for the area. The method further includes keeping and recording the static obstacles as a set of predefined static obstacles (also referred to as offline-generated, predetermined, or pre-recognized static obstacles) that will be used to aid the perception algorithm of the ADV to detect objects for the area in real-time.

According to some embodiments, a method for using the predefined static obstacles of an area to aid an online perception algorithm of an ADV is disclosed. The method includes receiving the predefined static obstacles of the area and sensor data for the area. The method also includes processing the sensor data for the area to trim regions-of-interest (ROI) of the area to exclude the predefined static obstacles. The method further includes running the perception algorithm of the ADV in real-time on the sensor data of the ROI to generate partial perception result. The method further includes adding the predefined static obstacles that have been excluded from the ROI back to the partial perception result to complete the perception output of the area from the perception algorithm.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download HD maps from servers 103 or 104 for use in motion planning and control.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
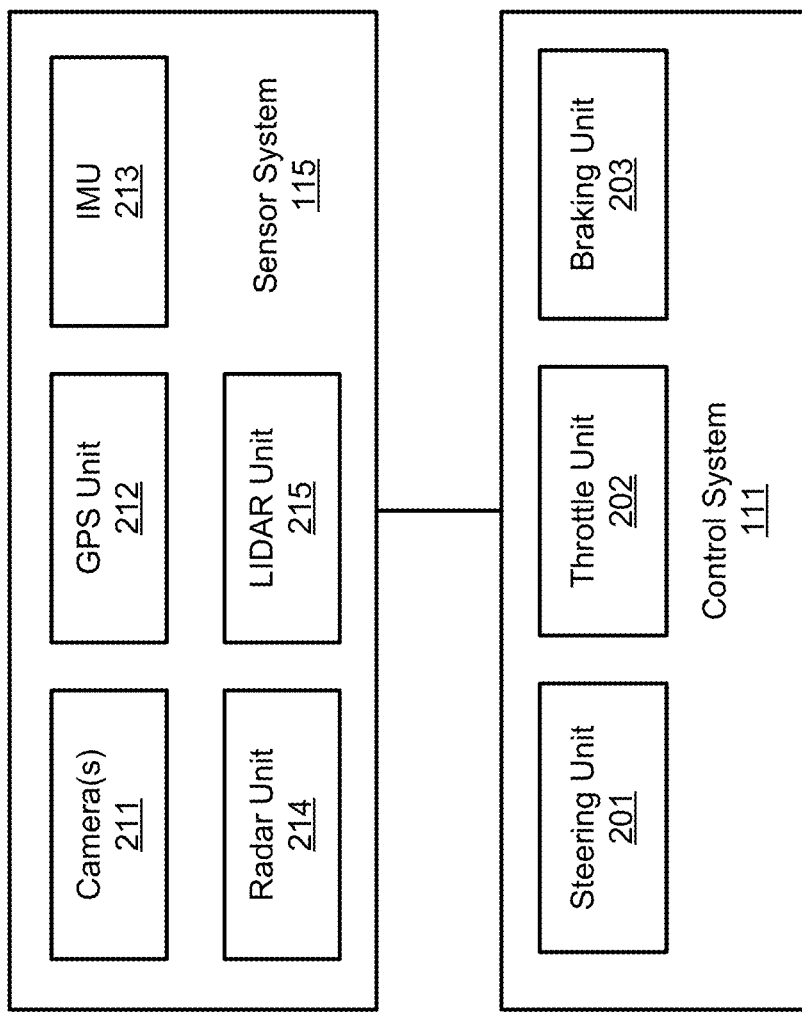
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor senses the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is configured to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, the location and MPOI information may be obtained from HD maps downloaded from servers 103-104.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include deep learning neural network models used to predict the trajectories of other vehicles in the environment of autonomous vehicle 101 to enable perception and planning system 110 to navigate autonomous vehicle 101 to avoid colliding with the other vehicles.

In some embodiments, data analytics system 103 may collect multiple point cloud data for an environment captured by sensor system 115 of autonomous vehicle 101 to generate a HD map of the environment. Perception and planning system 110 may process the multiple point cloud data during an offline map generation process to detect static objects when generating the map. Data collector 121 may record the detected static objects and information on the detected static objects. As mentioned, machine learning engine 122 may train the set of rules, algorithms, and/or predictive models 124 of a deep learning neural network of perception and planning system 110. The trained set of rules, algorithms, and/or predictive models 124 and the information on the detected static objects from the offline map generation process may be used by perception and planning system 110 to detect objects in the environment of autonomous vehicle 101 in real-time based on data captured by sensor system 115.

Algorithms 124 may be uploaded on ADVs to be utilized during autonomous driving in real-time or may be utilized by other modules such as obstacle tracking engine 125 of server 103. In one embodiment, obstacle tracking engine 125 can predict the near-term motions or trajectories of moving obstacles such as vehicles or pedestrians surrounding autonomous vehicle 101 based on the past trajectories of the moving obstacles and the environment in which the moving obstacles operate. Although obstacle tracking engine 125 is shown as part of server 103, in some embodiments, engine 125 may be part of server 104.

Figure 3A:
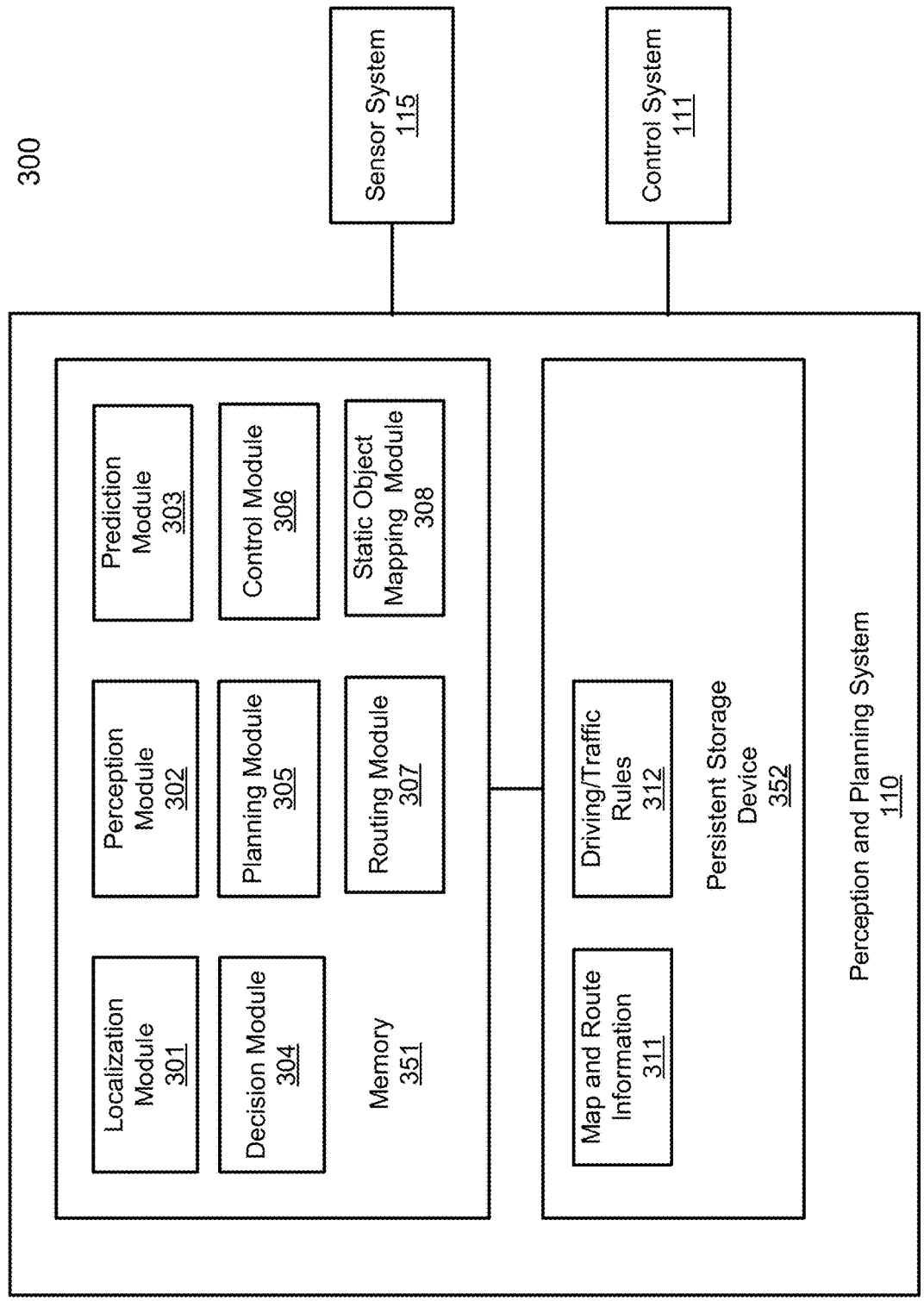
FIGS. 3A-3B are block diagrams illustrating an example of a perception and planning system used with an autonomous vehicle according to one embodiment.
Figure 3B:
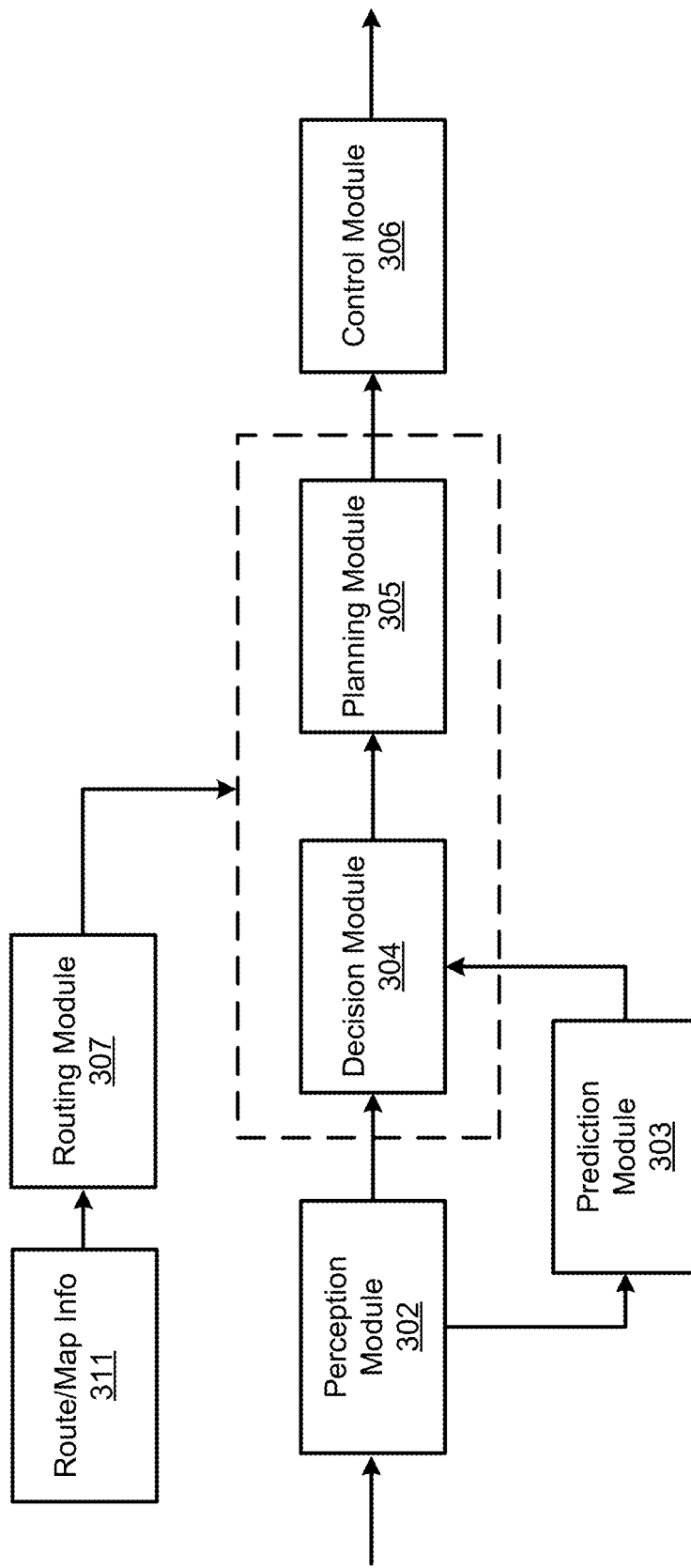

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and static object mapping module 308.

Some or all of modules 301-308 may be implemented in software, hardware, or a combination thereof. For example, these modules may be installed in persistent storage device 352, loaded into memory 351, and executed by one or more processors (not shown). Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions. Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. In one embodiment, the map and route information 311 may be HD maps. The HD maps may be downloaded from the location server and the MPOI server. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle 101. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. In one embodiment, perception module 302 may generate an image map that shows the current positions, current headings, and past trajectories of other vehicles or pedestrians in the environment of autonomous vehicle 101.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Thus, based on a decision for each of the objects perceived, decision module 304 and/or planning module 305 plans a path or route for the autonomous vehicle, as well as driving parameters (e.g., distance, speed, and/or turning angle), using the reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect pedestrians, vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In some embodiments, static object mapping module 308 may collect multiple point cloud data to map an environment captured by sensor system 115. Perception module 302 may process the multiple point cloud data to detect static objects in the mapped environment. Static object mapping module 308 may record the detected static objects and information on the detected static objects. The perception module 302 may use the recorded static objects as an aid to improve the detection of objects in the mapped environment surrounding the autonomous vehicle in real-time based on data captured by sensor system 115.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
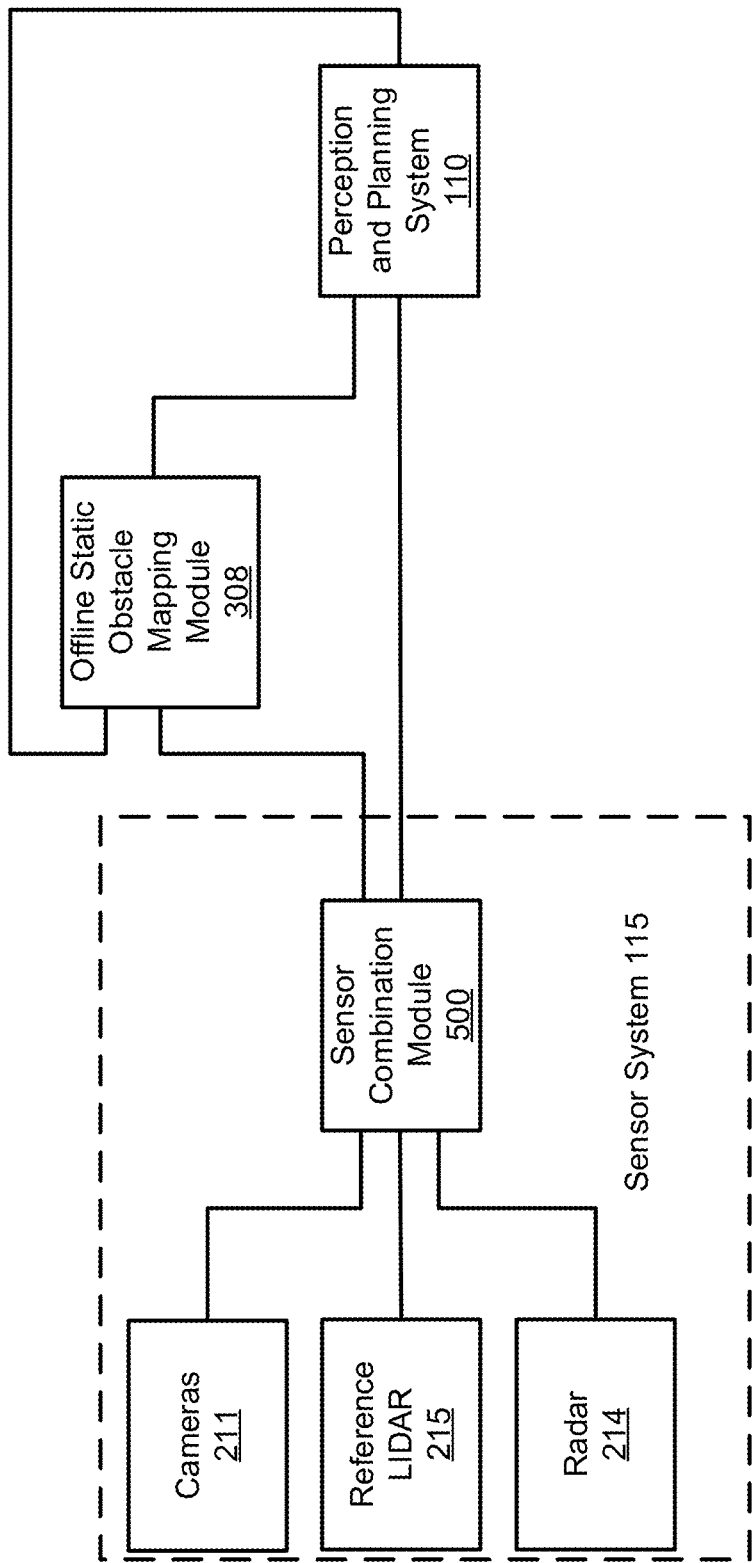
FIG. 5 is a block diagram illustrating an example of a perception and planning system that uses static obstacles of the surrounding environment mapped during an offline HD map collection process to aid in the online detection of objects according to one embodiment.

FIG. 5 is a block diagram illustrating an example of a perception and planning system 110 that uses static obstacles of the surrounding environment mapped during an offline HD map collection process to aid in the online detection of objects according to one embodiment. Offline static obstacle mapping module 308 may collect multiple point cloud data for an environment captured by sensor system 115 to generate a HD map of the environment. Perception and planning system 110 may process the multiple point cloud data during an offline map generation process to detect static objects when generating the HD map. Offline static obstacle mapping module 308 may record the detected static objects and information on the detected static objects. During online operation, when the ADV is in the environment of the HD map, perception and planning system 110 may use the recorded static objects as an aid to improve the detection of objects surrounding the ADV in real-time based on data captured by sensor system 115.

Sensor system 115 may include cameras 211, LIDAR 215, and radar 214. Cameras 211, LIDAR 215, and radar 241 may each include multiple sensors and each of the sensors may be associated with a channel for providing video or electromagnetic data of the environment surrounding the ADV. In one embodiment, sensor system 115 may include other types of sensors such as a GPS receiver, an IMU, an ultrasonic sensor, a GNSS (global navigation satellite system) receiver, and system sensors (e.g., temperature, humidity, pressure sensors), etc.

A sensor combination module 500 combines or merges sensor data from camera 211, LIDAR 215, and radar 214. The sensor data combining operation may include timestamp tagging of sensor data, video compression of data from camera 211, segmentation of compressed video data, time synchronization of sensor data, merging of sensor data, etc. During online operation, perception and planning system 110 may process the combined sensor data to detect objects and generate information on objects surrounding the ADV. The objects may include traffic signals, road way boundaries, other vehicles, pedestrians, and/or obstacles, etc. Information on the objects may include the current positions, current headings, and past trajectories of other vehicles or pedestrians in the environment. During the offline map generation process, perception and planning system 110 may process the combined sensor data to detect objects of the area to be mapped.

Offline static obstacle mapping module 308 may construct a HD map in the offline map generation process by using the ADV as a mapping vehicle to capture data points of an area to be mapped. The data points are referred to as a point cloud and correspond to a pose (e.g., position and orientation) of the sensors at a particular point in time when the data points are captured. Point clouds captured by sensor system 115 from many poses are used to construct the HD map of the area. The HD map may contain information such as road boundaries, lane configuration, terrains, etc., which may be used to navigate the ADV through the area.

Figure 6:
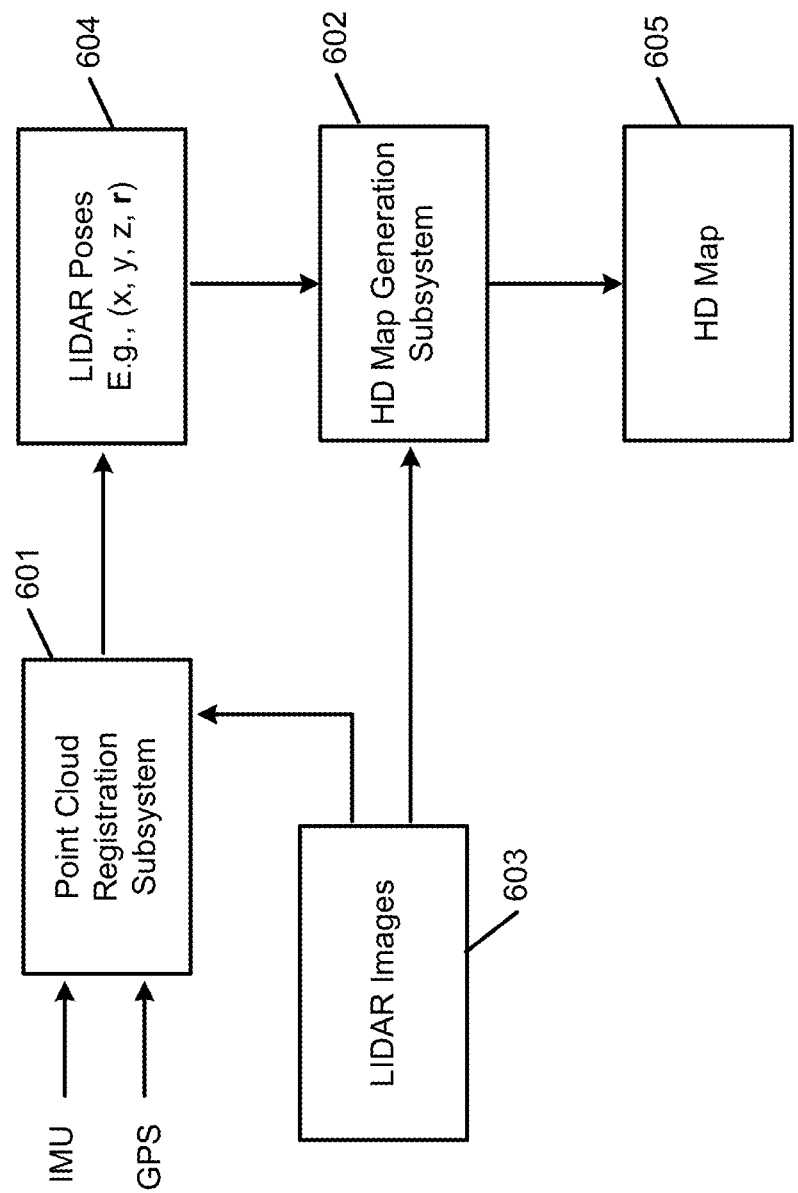
FIG. 6 is a block diagram illustrating an example of an HD map generation system according to one embodiment.

FIG. 6 is a block diagram illustrating an example of an HD map generation system 600 according to one embodiment. HD map generation system 600 may be part of offline static obstacle mapping module 308. In one embodiment, HD map generation system 600 includes point cloud registration subsystem 601 and HD map generation subsystem 602. Point cloud registration subsystem 601 can receive an IMU signal, a GPS signal, and LIDAR images 603 (e.g., from IMU 213, GPS unit 212, and LIDAR unit 215 respectively) as inputs and generates HD poses 604 (or aligns the poses for the LIDAR images 603) based on the received inputs. HD map generation subsystem 602 can then receive LIDAR images 603 and HD poses 604 as inputs and generate HD map 605 based on the inputs.

Referring back to FIG. 5, to generate the HD map, offline static obstacle mapping module 308 may capture and combine several point cloud data of the same area. For example, the mapping vehicle may drive through several laps of a route to capture multiple point cloud data for the route. In one embodiment, offline static obstacle mapping module 308 may capture and combine points cloud data of 10,000 points per lap for 5 to 10 laps of a given route. Perception and planning system 110 may run a perception algorithm on the combined point cloud data to construct an accurate HD 3D map of the route. As part of the offline HD map generation process, perception and planning system 110 may detect static objects. Because the combined point cloud data has more details for static objects that do not change among the point cloud poses, the detection of these static objects is improved. The static objects may be fixed road features such as guardrails, beams, traffic signs, trees, buildings, etc. The static objects may be used as an aid to improve the perception of objects in real-time when the ADV travels on the route.

In one embodiment, to detect the static objects, the offline HD map generation process may remove obstacles that are not static as detected by perception and planning system 110. For example, offline static obstacle mapping module 308 may remove moving objects such as moving vehicles, pedestrians, bicyclists, etc., from the HD map. The offline HD map generation process may further remove obstacles that are stationary but are movable such as parked vehicles, parked bicycles, traffic cones, temporary road signs, etc. These objects, though static when the area is HD mapped, may be moved at any time so they may longer be detected when the ADV is using the HD map in online operation. In one embodiment, the offline HD map generation process may further remove non-movable static objects that are outside an area of interest. For example, offline static obstacle mapping module 308 may only keep obstacles that are not on the road, but are less than 5 meters away from the road boundary so that objects that are not supposed to be on the road, e.g., rocks, are also removed. Offline static obstacle mapping module 308 may record non-movable static objects within the area of interest and may also record information on these static objects, such as their positions and shape during the offline HD map generation process.

During online operation of the ADV using the HD map, perception and planning system 110 may process the sensor data from sensor system 115 aided by the static objects recorded by offline static obstacle mapping module 308. In one embodiment, during a data preparation phase of the perception algorithm, perception and planning system 110 may trim the recorded static objects from the region of interest (ROI). The static objects may be trimmed from the ROI based on the positions of the static objects. For example, static objects such as a guardrail that is within a distance of 5 meters from the road boundary may be removed from the ROI. The guardrail may be blocked from view by another vehicle and removing the guardrail from the ROI may facilitate the detection of other objects in the ROI. After trimming the static objects from the ROI, perception and planning system 110 may execute the perception algorithm on the sensor data from sensor system 115 to detect objects in the ROI. The objects detected in the ROI may include moving objects such as vehicles, pedestrians, bicycles, or other obstacles on the road that were not part of the predefined recorded static objects such as lane configuration, crosswalks, other traffic related signs.

Static objects that have been removed from the ROI to facilitate the perception algorithm may be added back into the results of the perception algorithm. For example, perception and planning system 110 may restore the guardrail that was removed from the ROI of the perception algorithm into the perception results to complete the perception output. In one embodiment, perception and planning system 110 may restore all predefined static objects that are less than a maximum distance from the ADV. For example, recorded information including positions and shape of all predefined static objects that are less than 200 meters from all sides of the ADV may be restored to the perception results to complete the perception output. The perception output from perception and planning system 110 may be used by decision module 304 to make a decision on how to handle the objects detected in the perception output.

Figure 7:
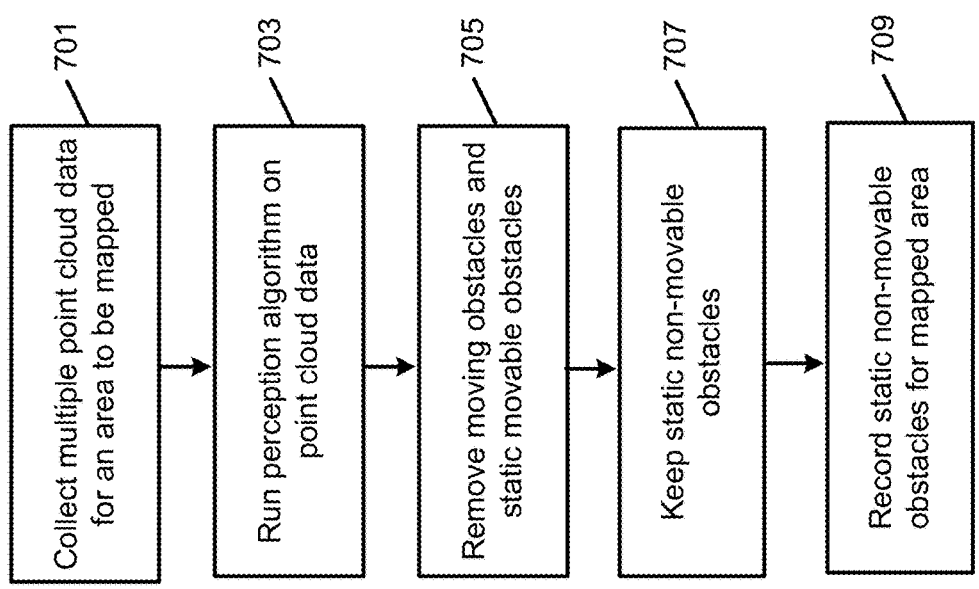
FIG. 7 is a flow diagram illustrating an example of a method for generating static obstacles mapped during an HD map collection process according to one embodiment.

FIG. 7 is a flow diagram illustrating an example of a method 700 for generating static obstacles mapped during a HD map collection process according to one embodiment. Method 700 may be performed by processing logic which may include software, hardware, or a combination thereof. For example, method 700 may be performed by the sensor system 115, offline static obstacle mapping module 308, and perception and planning system 110 of an autonomous vehicle, such as described in conjunction with FIG. 5.

At operation 701, the method 700 collects multiple point cloud data for an area to be mapped. The point cloud data may be captured by sensors such as cameras 211, LIDAR 215, and radar 214 of sensor system 115 of a mapping vehicle. The captured point cloud data may be associated with pose information (e.g., position and orientation) of the sensors at a particular point in time when the point cloud data are captured. The area to be mapped may be represented by many poses. To increase the details of the sensor data and to improve the perception results, points cloud data for the same area may be collected multiple times. For example, operation 701 may collect and combine point cloud data for 5 to 10 laps of a give route.

At operation 703, the method 700 runs perception algorithm on the collected point cloud data. In one embodiment, the perception algorithm may be run offline. Using a trained set of rules, algorithms, and/or predictive models of a deep learning neural network, the perception algorithm may detect obstacles such as traffic signals, road way boundaries, other vehicles, pedestrians, other obstacles, etc. for the area. Perception module 302 of perception and planning system 110 may execute the perception algorithm. The output from the perception algorithm may include a set of detected obstacles and information on the motions or trajectories of the obstacles.

At operation 705, the method 700 removes moving obstacles and static movable obstacles from the set of detected obstacles. In one embodiment, operation 705 may remove moving obstacles such as moving vehicles, pedestrians, bicyclists from the set of detected obstacles. Operation 705 may further remove obstacles that are stationary but are movable such as parked vehicles, parked bicycles, traffic cones, temporary road signs, etc., from the set of detected obstacles. The remaining obstacles may include non-movable static obstacles and other fixed road features such as guardrails, beams, traffic signs, trees, buildings, etc. Because the multiple point cloud data has more details for the static obstacles that do not change between the point cloud poses, the perception algorithm operating on the point cloud data during the map generation process may more accurately detect the static obstacles when compared to the perception algorithm operating in real-time when the ADV travels on the route.

At operation 707, the method 700 keeps static obstacles that are within an area of interest by removing static obstacles that are outside the area of interest from the set of detected obstacles. For example, operation 707 may keep static obstacles that are not on the road, but are less than 5 meters away from the road boundary. Static obstacles that are not supposed to be on the road such as rocks may be removed from the set of detected obstacles.

At operation 709, the method 700 records information on the static obstacles that remain in the set of detected obstacles. For example, the static obstacles may include obstacles such as guardrails, beams, traffic signs, trees, buildings, etc., that are less than 5 meters away from the road boundary of the route mapped. The recorded information may include the position and shape of each of the static obstacles. The recorded information of the static obstacles may be used as an aid to improve the real-time perception of objects in the vicinity of the route.

Figure 8:
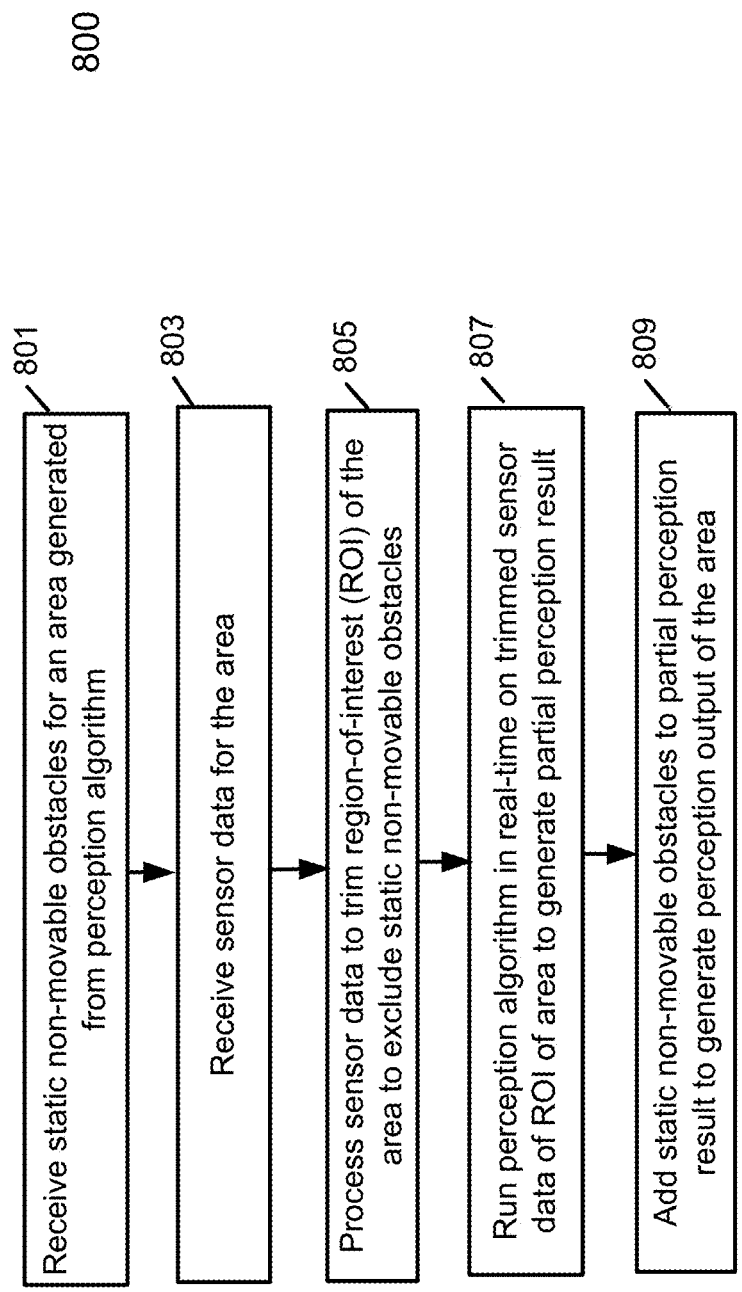
FIG. 8 is a flow diagram illustrating an example of a method for a perception algorithm to use static obstacles detected during an HD map collection process to aid in the online perception of objects according to one embodiment.

FIG. 8 is a flow diagram illustrating an example of a method 800 for a perception algorithm to use static obstacles detected during a HD map collection process to aid in the online perception of objects according to one embodiment. Method 800 may be performed by processing logic which may include software, hardware, or a combination thereof. For example, method 800 may be performed by the sensor system 115, offline static obstacle mapping module 308, and perception and planning system 110 of an ADV, such as described in conjunction with FIG. 5.

At operation 801, the method 800 receives static obstacles for an area generated by a perception algorithm. For example, operation 801 may receive positions and shapes of the static obstacles for a route of a mapped area recorded by the HD map collection process of FIG. 7.

At operation 803, the method 800 receives sensor data captured by sensors such as cameras 211, LIDAR 215, and radar 214 of sensor system 115 as the ADV travels in the area. The sensor data may have information on the pose (e.g., position and orientation) of the sensors so that positions of objects in the area represented by the sensor data, such as the route of the mapped area, may be determined.

At operation 805, the method 800 processes the sensor data to trim one or more regions-of-interest (ROI) of the area represented by the sensor data to exclude the static obstacles detected by the perception algorithm. In one embodiment, during a data preparation phase of the perception algorithm performed by perception module 302, perception and planning system 110 may trim the predefined static obstacles from the ROI based on the positions of the static obstacles. For example, a guardrail in the vicinity of the road boundary, such as the predefined guardrail that is less than 5 meters away from the road boundary of the route, may be removed from the ROI. The guardrail may be blocked from view by another vehicle and removing the guardrail from the ROI may facilitate the detection of other objects in the ROI.

At operation 807, the method 800 runs the perception algorithm in real-time on the trimmed ROI of the area represented by the sensor data to generate a partial perception result. For example, using the trained set of rules, algorithms, and/or predictive models of a deep learning neural network, perception module 302 may execute the perception algorithm on the sensor data representing the trimmed ROI of the environment of the route to detect objects in the ROI. The objects detected in the ROI may include moving objects such as vehicles, pedestrians, bicycles, or other obstacles on the route that are not part of the predefined static obstacles such as lane configuration, crosswalks, other traffic related signs.

At operation 809, the method 800 adds the predefined static obstacles removed from the ROI back into the partial perception result to generate the perception output of the area. For example, perception and planning system 110 may restore the predefined guardrail that was trimmed from the ROI of the area into the partial perception result from the perception algorithm to complete the perception output. In one embodiment, perception and planning system 110 may restore all predefined static obstacles that are less than a maximum distance from the ADV. For example, recorded information including positions and shape of all predefined static obstacles that are less than 200 meters from all sides of the ADV may be restored to the partial perception result to complete the perception output. The perception output from perception and planning system 110 may be used by decision module 304 to make a decision on how to handle the detected objects in the perception output.

A data processing system may perform any of the processes or methods described above, such as, for example, the method for generating static obstacles mapped during an HD map collection process or the method for using static obstacles detected during an HD map collection process to aid in the online perception of objects. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for aiding a perception algorithm of an autonomous driving vehicles (ADV), the method comprising:
    collecting a plurality of point cloud data for an area from one or more sensors;
    running the perception algorithm on the plurality of point cloud data to detect a plurality of obstacles for the area;
    removing one or more moving obstacles and one or more stationary obstacles that are movable from the plurality of obstacles to generate a plurality of static obstacles;
    removing one or more non-movable stationary obstacles that are outside an area of interest from the plurality of static obstacles to generate at least a subset of the static obstacles;
    recording the at least a subset of the static obstacles as a set of predefined static obstacles associated with the area for aiding the perception algorithm of the ADV to detect objects for the area in real-time; and
    generating a map associated with the area based on the set of predefined static obstacles, wherein the map is utilized by the perception algorithm of the ADV to navigate through the area.

2. The method of claim 1, wherein collecting a plurality of point cloud data for an area from one or more sensors comprises:
collecting point cloud data captured by the one or more sensors for a same area for a plurality of repetitions.

3. The method of claim 1, wherein running the perception algorithm on the plurality of point cloud data to detect a plurality of obstacles for the area comprises:
detecting motions of the plurality of obstacles by the perception algorithm.

4. The method of claim 1, wherein the subset of the plurality of static obstacles that constitutes the set of predefined static obstacles comprises one or more of the static obstacles that are within the area of interest of the area.

5. The method of claim 1, wherein recording the set of predefined static obstacles comprises:
recording one or more of a position and a shape for each of the predefined static obstacles of the set.

6. The method of claim 1, further comprising:
receiving sensor data for the area captured by the one or more sensors;
processing the sensor data for the area to trim one or more regions-of-interest (ROI) of the area to exclude one or more of the predefined static obstacles;
running the perception algorithm of the ADV in real-time on the sensor data of the ROI to generate a partial perception result; and
adding the one or more of the predefined static obstacles that have been excluded from the ROI to the partial perception result to generate a perception output of the area.

7. The method of claim 6, wherein recording the set of predefined static obstacles comprises recording a position for each of the predefined static obstacles of the set, and wherein processing the sensor data for the area to trim one or more ROI of the area to exclude one or more of the predefined static obstacles comprises:
excluding the one or more predefined static obstacles from the sensor data of the ROI based on the positions for the one or more predefined static obstacles.

8. The method of claim 6, wherein running the perception algorithm of the ADV in real-time on the sensor data of the ROI to generate a partial perception result comprises:
detecting one or more moving objects in the ROI.

9. The method of claim 6, wherein adding the one or more of the predefined static obstacles that have been excluded from the ROI to the partial perception result to generate a perception output of the area comprises:
adding one or more of the predefined static objects that have been excluded from the ROI and that are less than a threshold distance from the ADV to the partial perception result.

10. A non-transitory machine-readable medium having instructions stored therein, which when executed by a processor, cause the processor to perform operations to aid a perception algorithm of an autonomous driving vehicles (ADV), the operations comprising:
collecting a plurality of point cloud data for an area from one or more sensors;
running the perception algorithm on the plurality of point cloud data to detect a plurality of obstacles for the area;
removing one or more moving obstacles and one or more stationary obstacles that are movable from the plurality of obstacles to generate a plurality of static obstacles;
removing one or more non-movable stationary obstacles that are outside an area of interest from the plurality of static obstacles to generate at least a subset of the static obstacles;
recording the at least a subset of the static obstacles as a set of predefined static obstacles associated with the area for aiding the perception algorithm of the ADV to detect objects for the area in real-time; and
generating a map associated with the area based on the set of predefined static obstacles, wherein the map is utilized by the perception algorithm of the ADV to navigate through the area.

11. The non-transitory machine-readable medium of claim 10, wherein collecting a plurality of point cloud data for an area from one or more sensors comprises:
collecting point cloud data captured by the one or more sensors for a same area for a plurality of repetitions.

12. The non-transitory machine-readable medium of claim 10, wherein running the perception algorithm on the plurality of point cloud data to detect a plurality of obstacles for the area comprises:
detecting motions of the plurality of obstacles by the perception algorithm.

13. The non-transitory machine-readable medium of claim 10, wherein the subset of the static obstacles that constitutes the set of predefined static obstacles comprises one or more of the static obstacles that are within the area of interest of the area.

14. The non-transitory machine-readable medium of claim 10, wherein recording the set of predefined static obstacles comprises:
recording one or more of a position and a shape for each of the predefined static obstacles of the set.

15. The non-transitory machine-readable medium of claim 10, wherein the operations further comprise:
receiving sensor data for the area captured by the one or more sensors;
processing the sensor data for the area to trim one or more regions-of-interest (ROI) of the area to exclude one or more of the predefined static obstacles;
running the perception algorithm of the ADV in real-time on the sensor data of the ROI to generate a partial perception result; and
adding the one or more of the predefined static obstacles that have been excluded from the ROI to the partial perception result to generate a perception output of the area.

16. The non-transitory machine-readable medium of claim 15, wherein recording the set of predefined static obstacles comprises:
recording a position for each of the predefined static obstacles of the set, and wherein processing the sensor data for the area to trim one or more regions-of-interest (ROI) of the area to exclude one or more of the predefined static obstacles comprises:
excluding the one or more predefined static obstacles from the sensor data of the ROI based on the positions for the one or more predefined static obstacles.

17. The non-transitory machine-readable medium of claim 15, wherein running the perception algorithm of the ADV in real-time on the sensor data of the ROI to generate a partial perception result comprises:
detecting one or more moving objects in the ROI.

18. The non-transitory machine-readable medium of claim 15, wherein adding the one or more of the predefined static obstacles that have been excluded from the ROI to the partial perception result to generate a perception output of the area comprises:
  adding one or more of the predefined static objects that have been excluded from the ROI and that are less than a threshold distance from the ADV to the partial perception result.

19. A data processing system, comprising:
  a processor; and
  a memory coupled to the processor to store instructions, which when executed by the processor, cause the processor to perform operations to aid a perception algorithm of an autonomous driving vehicles (ADV), the operations comprising:
    collecting a plurality of point cloud data for an area from one or more sensors;
    running the perception algorithm on the plurality of point cloud data to detect a plurality of obstacles for the area;
    removing one or more moving obstacles and one or more stationary obstacles that are movable from the plurality of obstacles to generate a plurality of static obstacles;
    removing one or more non-movable stationary obstacles that are outside an area of interest from the plurality of static obstacles to generate at least a subset of the static obstacles;
    recording the at least a subset of the static obstacles as a set of predefined static obstacles associated with the area for aiding the perception algorithm of the ADV to detect objects for the area in real-time; and
    generating a map associated with the area based on the set of predefined static obstacles, wherein the map is utilized by the perception algorithm of the ADV to navigate through the area.

20. The data processing system of claim 19, wherein the operations further comprise:
  receiving sensor data for the area captured by the one or more sensors;
  processing the sensor data for the area to trim one or more regions-of-interest (ROI) of the area to exclude one or more of the predefined static obstacles;
  running the perception algorithm of the ADV in real-time on the sensor data of the ROI to generate a partial perception result; and
  adding the one or more of the predefined static obstacles that have been excluded from the ROI to the partial perception result to generate a perception output of the area.

* * * * *